(12) United States Patent
Aiello et al.

(10) Patent No.: US 11,518,486 B2
(45) Date of Patent: Dec. 6, 2022

(54) SECURE, REMOVABLE, WET PLUGGABLE DATA CRYPT FOR UNMANNED UNDERSEA VEHICLES

(71) Applicant: L3Harris Technologies, Inc., Melbourne, FL (US)

(72) Inventors: Jason D. Aiello, Fairhaven, MA (US); Daryl B. Slocum, La Mesa, CA (US); Douglas L. Veilleux, II, Rochester, MA (US); Cagdas Altin, Warren, RI (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 308 days.

(21) Appl. No.: 16/877,018

(22) Filed: May 18, 2020

(65) Prior Publication Data

US 2021/0276677 A1  Sep. 9, 2021

Related U.S. Application Data

(60) Provisional application No. 62/875,441, filed on Jul. 17, 2019.

(51) Int. Cl.
*B63G 8/00* (2006.01)
*B63G 8/38* (2006.01)
*H04L 12/40* (2006.01)
*H04L 43/18* (2022.01)
*G07C 5/08* (2006.01)

(52) U.S. Cl.
CPC ............ *B63G 8/001* (2013.01); *B63G 8/38* (2013.01); *G07C 5/085* (2013.01); *H04L 12/40* (2013.01); *H04L 43/18* (2013.01); *B63G 2008/002* (2013.01); *H04L 2012/40286* (2013.01)

(58) Field of Classification Search
CPC . B63G 8/00; B63G 8/001; B63G 8/38; B63G 2008/002; G07C 5/085; H04L 12/40; H04L 43/18
USPC .......................................................... 701/21
See application file for complete search history.

(56) References Cited

U.S. PATENT DOCUMENTS 11,186,350 B2 * 11/2021 Charles .................. B63G 8/001

* cited by examiner

*Primary Examiner* — Lars A Olson
(74) *Attorney, Agent, or Firm* — Workman Nydegger

(57) ABSTRACT

An unmanned undersea vehicle includes one or more vehicle sections. The sections include a vehicle hull. The vehicle includes a data crypt configured to be selectively removable from the vehicle through the hull of the vehicle. The data crypt includes a persistent storage device configured to operate using SATA protocols and one or more electrical connectors configured to selectively connect the data crypt to electrical equipment in the vehicle, wherein the connectors are impedance matched to mating connectors in the vehicle.

20 Claims, 8 Drawing Sheets

SECURE, REMOVABLE, WET PLUGGABLE DATA CRYPT FOR UNMANNED UNDERSEA VEHICLES

CROSS-REFERENCE TO RELATED APPLICATIONS

This application claims the benefit of and priority to U.S. Provisional Patent Application Ser. No. 62/875,441 filed on Jul. 17, 2019 and entitled "SECURE, REMOVABLE, WET PLUGGABLE DATA CRYPT FOR UNMANNED UNDERSEA VEHICLES," which application is expressly incorporated herein by reference in its entirety.

BACKGROUND

More than 90 percent of our oceans are unexplored. The ocean has the potential to answer many of our important unanswered questions.

Unmanned undersea vehicles (UUV), can be utilized to carry payloads and software packages to detect, classify, localize, identify, and/or retrieve targets. Often, the UUVs are sent to gather information that may need to be protected from being exposed to unauthorized parties. For example, because of the massive amounts of unexplored ocean, new scientific expeditions could result in groundbreaking discoveries. These excursions are costly for the researchers and there may be a desire by the researchers to keep research confidential until the researchers are ready to release their findings. Additionally, during government classified missions to collect information, the information may need to be kept secret to protect national interests.

Accordingly, there is a need for apparatus and methods protecting information gathered by UUVs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments illustrated herein are directed to components that can be used in an unmanned undersea vehicle (UUV). These vehicles can be used to carry payloads and software packages to detect, classify, localize, identify and/or retrieve targets. In some embodiments, such vehicles may be designed to meet certain constraints.

Embodiments illustrated herein may include components that help to meet certain corrosion resistance requirements. Alternatively, or additionally, embodiments may include components configured to meet certain buoyancy requirements.

The UUV may, in some embodiments, be equipped with a data crypt that acts as the only persistent data storage on the vessel for transient data. That is, in some embodiments, the data crypt is the only location where received data can be stored in persistent data storage. Data transferred to other locations in the vehicle are only allowed to be stored in volatile data storage. The data stored in the data crypt is only readable using a key kept in a watchdog system within the internal structure of the UUV. If tampered with, the watchdog system erases the key rendering the data in the data crypt unrecoverable. Upon collection of the UUV, the data crypt can be removed, and the data stored on it retrieved using the key known by the owner or operator of the UUV.

In some embodiments the data crypt has holds molded into the side of the casing to help with removal of the devices from the UUV as well as a removal mechanism that locks and releases the data crypt from the UUV. The data crypt also contains a re-driver board that enables signal amplification. The data is transmitted into the device using connectors that extend through the side of the data crypt, through the installed cable length and the re-driver board and to nonvolatile storage.

In some embodiments, the face of the data crypt is curved so it can sit flush with the side of the hull of the UUV when selectively installed in the UUV. In some embodiments, other portions of the data crypt are either shaped as a rectangular prism, or a rectangular prism with a cut out along the longest side for better sealing to prevent water from getting to the connectors.

In some embodiments, the connectors have a size and shape for matching the characteristic impedance $Z_0$ of transmission lines providing data to the data crypt, which are usually 100 Ohms. When the characteristic impedances are closely matched, signals can be delivered to the data crypt and read from the data crypt with less data error and at higher data rates than when connectors are less closely matched to the transmission lines.

In some embodiments, the connectors can be further coated with rubber material on portions of the connectors to ensure a tight seal preventing possible water damage. In one embodiment, an uncovered portion of a male plug connector is entirely encased in a receptacle portion of a female connector and causing rubber material to sit flush against the receptacle portion and to cover the otherwise exposed male plug connectors.

In some embodiments, the re-driver board contains circuitry that conforms to a precise tolerance for characteristic impedance. When the tolerance is precise, the transmission lines implemented on the re-driver board can match the characteristic impedance of the transmission lines delivering data and the characteristic impedance of the connectors. When the characteristic impedances are closely matched on the various components, high bit rates, and low error rates can be achieved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Unmanned undersea vehicles are useful for gathering important information in underwater locations. In some embodiments, such vehicles may be designed to meet certain constraints. For example, in some embodiments, the vehicles are designed to be less than 240 pounds, operate at 1000 feet below the surface of a body of water, be less than 99 inches in length, and be less than 9 inches in diameter. Indeed, in some embodiments, such vehicles may be configured to be used in torpedo tubes of various watercraft.

Embodiments illustrated herein may include components that help to meet certain corrosion resistance requirements. Alternatively, or additionally, embodiments may include components configured to meet certain buoyancy requirements.

Further, embodiments illustrated herein may include features to meet certain data protection requirements for data at the UUV.

Figure 1:
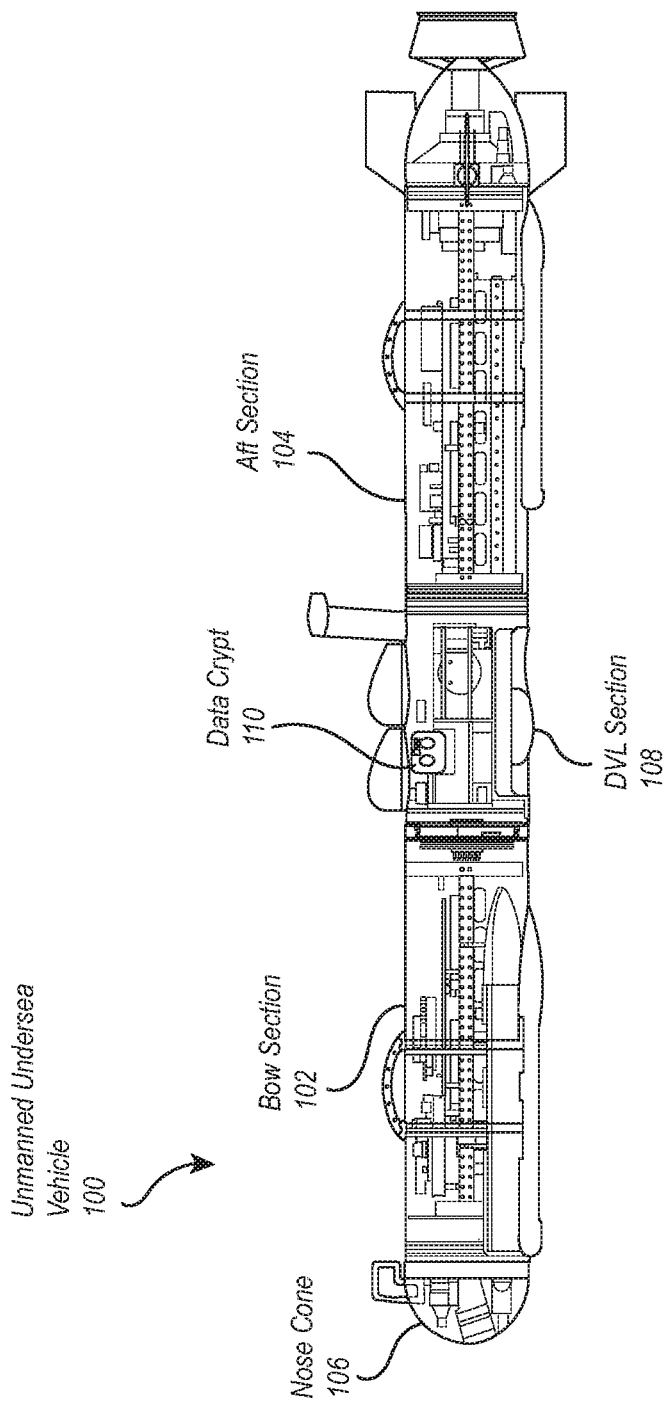
FIG. 1 illustrates a full UUV system.

Referring now to FIG. 1, an example vehicle 100 is illustrated. The vehicle 100 includes various sections including a bow section 102 and an aft section 104. The bow section 102 is coupled to a nosecone 106. The nosecone is, in some embodiments constructed at least partially having a foam shell which provides weight savings and buoyancy. In particular, the nosecone 106 may be positively buoyant when submerged in water. In some embodiments, the nosecone is constructed from syntactic foam including hollow glass beads and urethane. The nose cone 106 may include open portions and/or portions covered by alternative materials, for use with sensors. For example, in some embodiments, sonar sensors may be used by the vehicle 100. In some embodiments, the nosecone 106 will include a portion that is penetrable by the sonar signals produced by the sonar sensors.

As illustrated in the example illustrated in FIG. 1, the vehicle includes certain sensors, propulsion devices, power sources such as battery packs, control circuitry, storage, etc. For example, attention is directed to a DVL section 108.

The DVL section 108 includes an electronics backplane including a watchdog system and battery. The watchdog system may be implemented using various processors, memory, computer instructions (which may be stored in volatile memory, stored in firmware, or combinations thereof). Typically, the watchdog system will be implemented using at least one processor. As will be explained in more detail below, the watchdog system may include the ability to perform complex decrypting of data and to implement data protection schemes to prevent compromising important data.

It should be noted that often the vehicle 100 may be used in government classified situations which requires, due to certain governmental restrictions, that any portion of the vehicle that is able to store data permanently, may need to be treated as a classified device. Therefore, in some embodiments, the watchdog system does not include any portion that can store new data persistently. Rather, the watchdog system can use permanently encoded firmware data and/or data included in volatile memory. In this way, one can ensure that the watchdog system, in an unpowered state, does not contain any classified information such that at least that portion of the vehicle 100 will not need to be treated as containing classified information when that portion is in an unpowered state. The watchdog system may be able to store data permanently in an attached, removable data crypt 110 that is removable through the hull of the vehicle 100, such that the data crypt 110 can be treated as a classified device and treated accordingly, without needing to treat the rest of the vehicle 100 as a classified device, when in certain operating states.

In particular, the removable data crypt 110 may include storage such as hard drives, SSD drives, or other nonvolatile storage type devices. In some embodiments, the data crypt 110 includes encrypted data. The encrypted data can only be read using a key held by the watchdog system. The key is stored by the watchdog system in volatile memory. This is done to protect the data in the data crypt 110. In particular, if power is lost to the watchdog system, the key stored in the volatile memory of the watchdog system will be lost. This will render the data in the data crypt 110 unreadable should the vehicle 100 be captured by an adversarial entity. Even if power is able to be restored to the watchdog system, the key will have been irretrievably lost from the perspective of the vehicle 100.

Note that on initial startup of the vehicle 100, the key can be generated for the watchdog system. In some embodiments, this can be accomplished by connecting the vehicle 100 to a control computer system and supplying the control computer system with a secret key which can be used to generate the key for the watchdog system. For example, there are various communication ports under the nosecone 106 that can be coupled to an external computer system. The communication ports are coupled to the watchdog system. This allows the external computer system to be coupled to the watchdog system to provide the generated key to the watchdog system. As illustrated above, the watchdog system can store this generated key in volatile memory of the watchdog system for use in reading and writing data to the data crypt 110.

For example, in some embodiments the control computer system may include a key generation module configured to generate encryption keys for the data crypt. In some embodiments, the key generation module is configured to receive a key from a user and to generate an encryption/decryption key that can be used to encrypt/decrypt data on the data crypt. The encryption/decryption key can be used to read and write data from and to the data crypt. Additionally, the key generation module can be used to later regenerate the encryption/decryption key should the key be lost in the watchdog system. In this way, data on the data crypt can be read at a later time by a user that has the key used for creating the encryption/decryption key.

Figure 2:
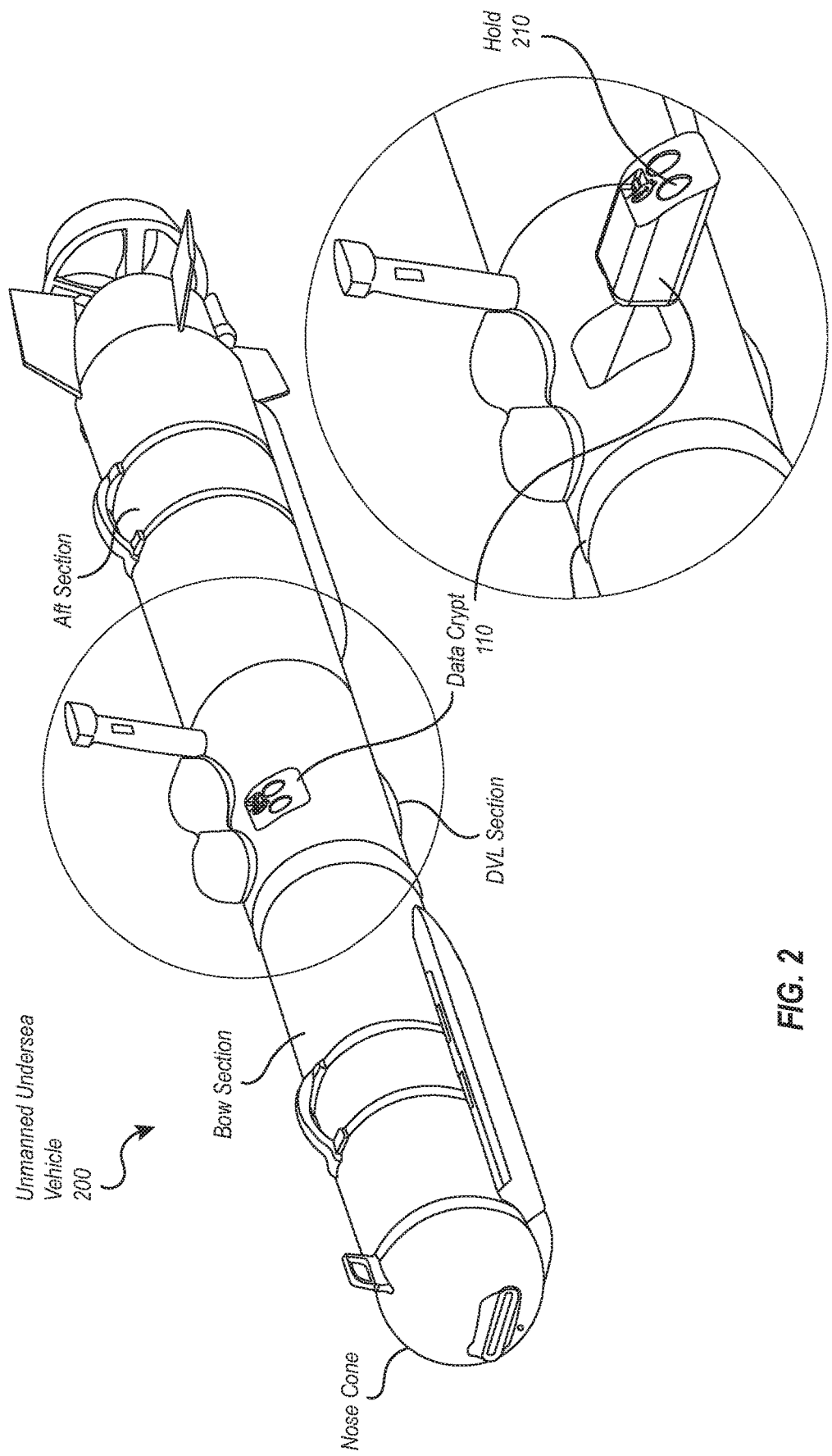
FIG. 2 illustrates the data crypt in relation to the full UUV system.

Referring now to FIG. 2, additional details are illustrated. FIG. 2 illustrates that the data crypt 110 is removable from the vehicle 100. In the example illustrated in FIG. 2 the data crypt is shown with various holds 210 which can be grasped by a user to apply an appropriate force and grip to remove the data crypt 110 from the vehicle 100.

As noted previously, the data crypt 110, in some embodiments, is the only location on the vehicle 100 where certain data can be persistently stored where persistently storing means storing in a fashion where the data remains even after power to a device storing the data is shut off. That is, in some embodiments, the data crypt 110 is the only location on the underwater vehicle 100 where data can exist even after power is lost to the underwater vehicle or to certain components in the underwater vehicle 100. In other words, in some embodiments, the data crypt 110 is the only persistent storage for certain types of data on the underwater vehicle 100.

Thus, if power is lost to the underwater vehicle 100, the data crypt 110 will persist any written data, however other portions of the underwater vehicle 100, that are not powered, may lose all data. In other embodiments, when power is lost to the underwater vehicle 100, the data crypt 110 will persist any written data, however other portions of the underwater vehicle 100 may lose any data not associated with the background operation of the underwater vehicle 100.

In particular, certain categories of data are only stored persistently on the data crypt 110, whereas when data of those categories exist elsewhere in the underwater vehicle 100, they are stored in a volatile fashion such that those data will be lost if power to the devices storing those data is disconnected. Some such categories are now illustrated.

For example, in some embodiments, data collected by certain sensors, while the UUV is deployed in an underwater environment, will only be stored persistently at the data crypt 110 while being prevented from being stored persistently at other locations. If that data exists in other locations in the underwater vehicle 100, it will only exist in a volatile fashion. For example, in some embodiments, data collected from certain cameras (including visible light and/or IR), sonar devices, depths sensors, GPS or other geo-locating hardware, bathymetry hardware, etc. will only ever be stored persistently on the data crypt 110. When data from those devices exists in the underwater vehicle 100 in other locations, it will only exist in a volatile fashion. This can be accomplished by excluding writable persistent storage in other locations in the vehicle, or programming processors to only store data on the data crypt 110, or by other means.

In some embodiments, any data transmitted from certain hardware will not be allowed to be stored persistently in any location on underwater vehicle 100 except the data crypt 110. For example, in addition to the sensor hardware described above (or alternatively), hardware such as certain processors, memory devices, communication busses, or other hardware devices will be configured in the underwater vehicle 100 in a fashion where any data transmitted from those devices is not permitted to be stored in persistent storage, unless that persistent storage is the data crypt 110.

Figure 3:
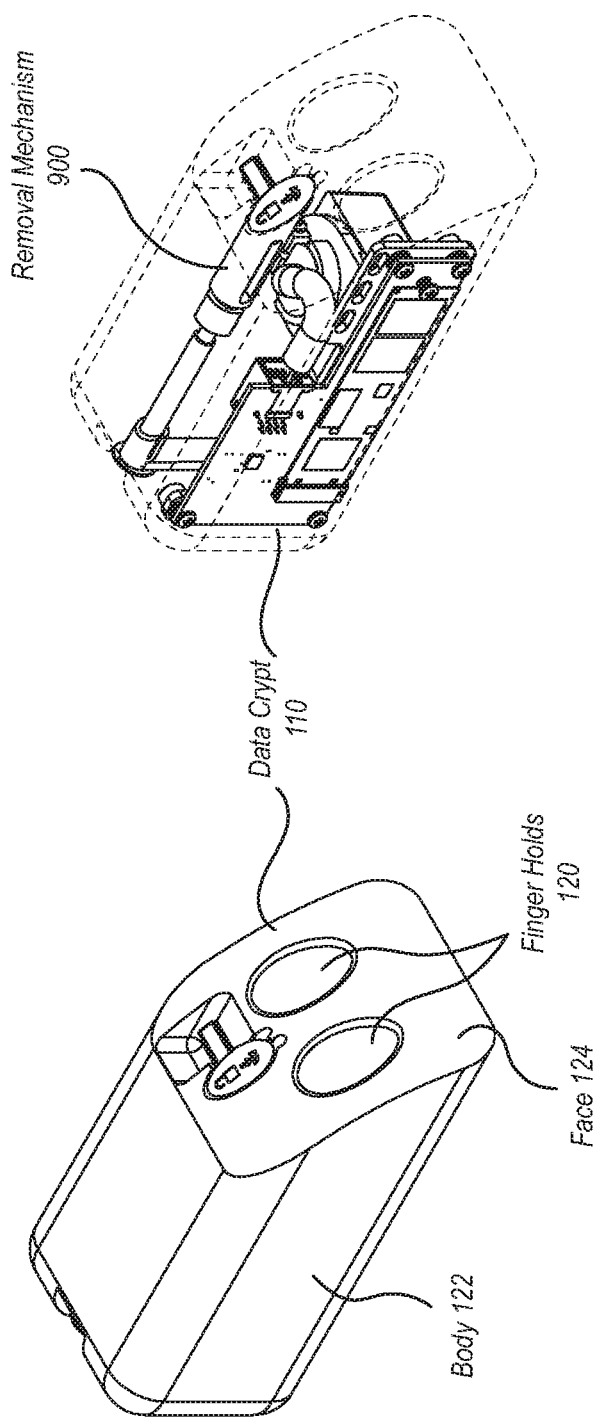
FIG. 3 illustrates the data crypt external view and internal view.

Referring now to FIG. 3, additional details are illustrated. In previous systems, such data storage systems have typically used network area storage (NAS) to store removable data. These systems typically use Gigabit Ethernet interfaces. As such, the data transfer rates for reads and writes are limited to Gigabit Ethernet speeds. However, these speeds may be insufficient for certain applications. Therefore, some embodiments of the invention are able to implement data crypts using SATA protocols which allows for much higher data rates to be implemented. For example, SATA 1 operates above 1 Gb/s, with the standard speed being 1.5 Gb/s, SATA II operates at 3.0 Gb/s, and SATA III operates at 6.0 Gb/s. Note that previous systems have been unable to implement similar data storage using SATA protocols due to the inability to achieve appropriate signal-to-noise ratio and communication rates.

FIG. 4 depicts examples of graphical interpretations of digital signal communication clarity called eye diagrams. An eye diagram is created by capturing actual individual signal pulses and overlaying a number of the individual captured pulses on each other. A signal can be analyzed using an eye diagram to determine if appropriate bit rate, clock rate, proper bit interpretation is being achieved. In particular, an eye diagram overlays signals segments representing individual bits onto each other so that an analysis of signal characteristics and consistency can be evaluated.

Figure 4A:
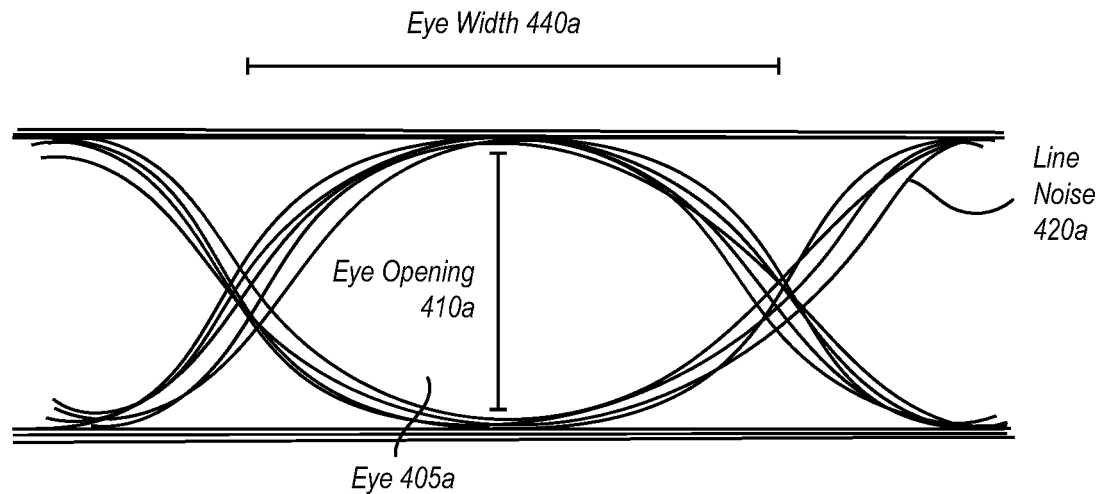
FIG. 4a illustrates a proper eye diagram.

The graph of FIG. 4a depicts an example of a proper eye diagram 400a and illustrates a well-received signal. An eye diagram should be shaped as a wide-open eye 405a, as determined by a predetermined standard for differences between high and low signals. The openness of the eye 405a can be affected by noise (disturbances of the signal), signal path interruptions, attenuation of the signal, timing synchronization errors and/or other factors. The higher the eye opening 410a, the lower the error rates. The height is affected by noise. If noise is introduced to the system, the eye closes indicating poor signal communication. Additionally, the eye width 440a should be as wide as possible to facilitate high communication rates. If there is poor timing, unexpected delays or signals shifts, etc. synchronization, the eye width 440a closes and the shape is distorted. Another effect of noise is a separation of the paths of the individual lines in the eye diagram as seen by the diverges of the line noise 420a. Because the noise is low, the lines approximately follow the correct path in the eye diagram 400a, causing the eye to be an acceptable shape, as defined by some predetermined criteria.

Figure 4B:
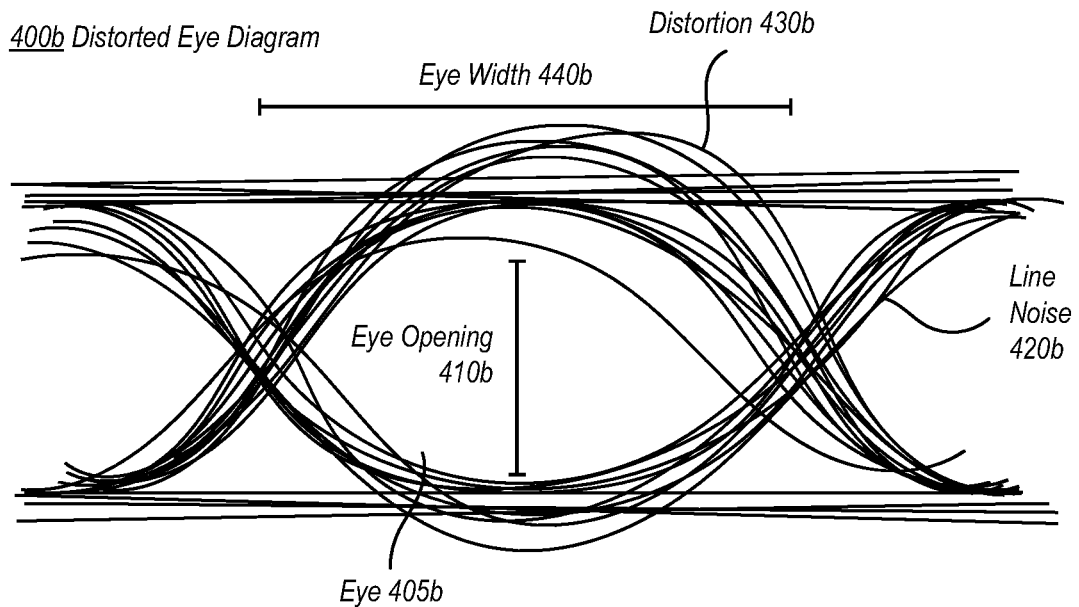
FIG. 4b illustrates a distorted eye diagram.

The graph of FIG. 4b, presents an example of a distorted eye diagram 400b, as a result of not meeting certain predetermined quality criteria. A distorted eye diagram 400b, indicates the signal being received is not as easily read and the data transmitted may be getting lost or corrupted. The eye 405b of FIG. 4b, is much smaller than the proper eye diagram 400a eye 405a, which indicates a signal susceptible to high error rates and only able to transmit at low data rates, higher power levels, etc. In this diagram, the signal may be being distorted by several factors. The eye opening 410b is smaller, potentially, because of additional noise or other distortion in the system. That same noise is causing the lines to diverge with each additional bit sample of the diagram as seen by the line noise 420b. The eye width 440b may also be smaller because of noise, a potential timing synchronization problem indicating the clock rate of transmission does not equal the receiving clock rate, or unexpected signal shifting. A further problem could be overshoot/undershoot which means the interpretation of the data is being performed incorrectly and the signal is, in this example, higher than it should be, thus causing distortion 430b.

Figure 5:
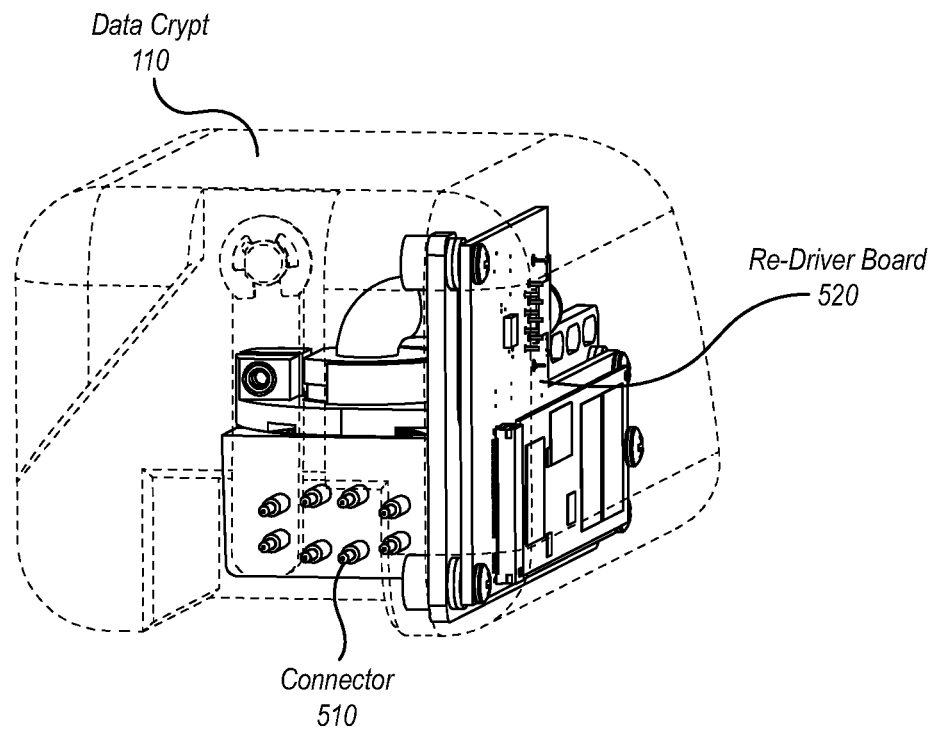
FIG. 5 illustrates an internal view of the data crypt from the connecting side.

Embodiments illustrated herein are able to achieve the data rates necessary to use SATA protocols (such as signals that can be characterized similar to the signals illustrated in FIG. 4a) by using a number of unique and novel components. For example, FIG. 5 illustrates embodiments may implement a specialized connector 510 for connecting the data crypt 110 to other electronics, such as processors, volatile memory, and other equipment in the vehicle. The data crypt 110 depicted in FIG. 5 is an x-ray, phantom rendering (showing the exterior, with phantom rendering of internal components) seen from the male connector side that slides into the UUV. Ordinarily, the data crypt 110, as described below, will include an opaque potting material around the internal components, but for clarity, FIG. 5 illustrates the components with respect to the outer surfaces of the data crypt 110. The data crypt 110 contains an installed cable length 600 piece that connects the signal entering through the external connector 510 to the re-driver board 520.

Figure 6:
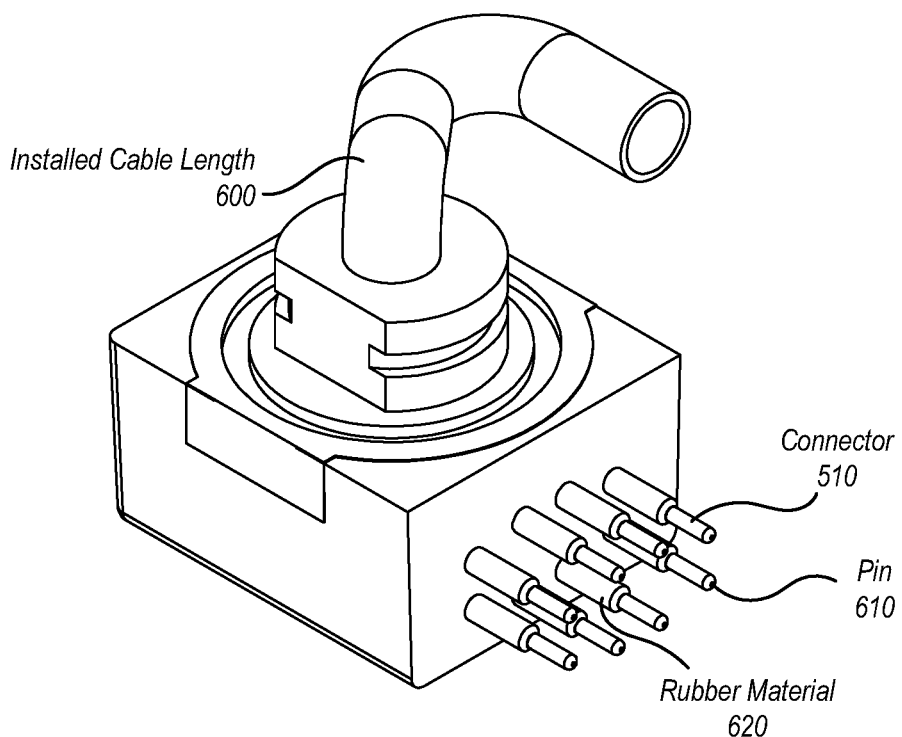
FIG. 6 illustrates the installed cable length and connectors of the data crypt.

FIG. 6 further illustrates an embodiment of the installed cable length 600 coupled to the specialized connector 510. The specialized connector 510 is a watertight connector which includes pins, such as pin 610, which are partially coated in a rubber material 620, where the pins and rubber materials mate with rubber materials of a receptacle to form a watertight seal. In some embodiments, the connectors are precision matched with respect to characteristic impedance. In particular, the transmission lines used in the system are typically 100 Ohm characteristic impedance $Z_0$ transmission lines. This means that the connector 510 should also be a 100-ohm connector 510. However, the connector 510 is precision matched in terms of characteristic impedance. Some embodiments of the invention use connectors that are 100 Ohm characteristic impedance $Z_0$ connectors within a specific tolerance. The connector 510 is precision matched with a mating connector on the vehicle 100 which connects the data crypt to other components, such as the watchdog system. That is, a mating connector on the vehicle may be a 100 Ohm (within some tolerance) mating connector for the connector 510.

Figure 7:
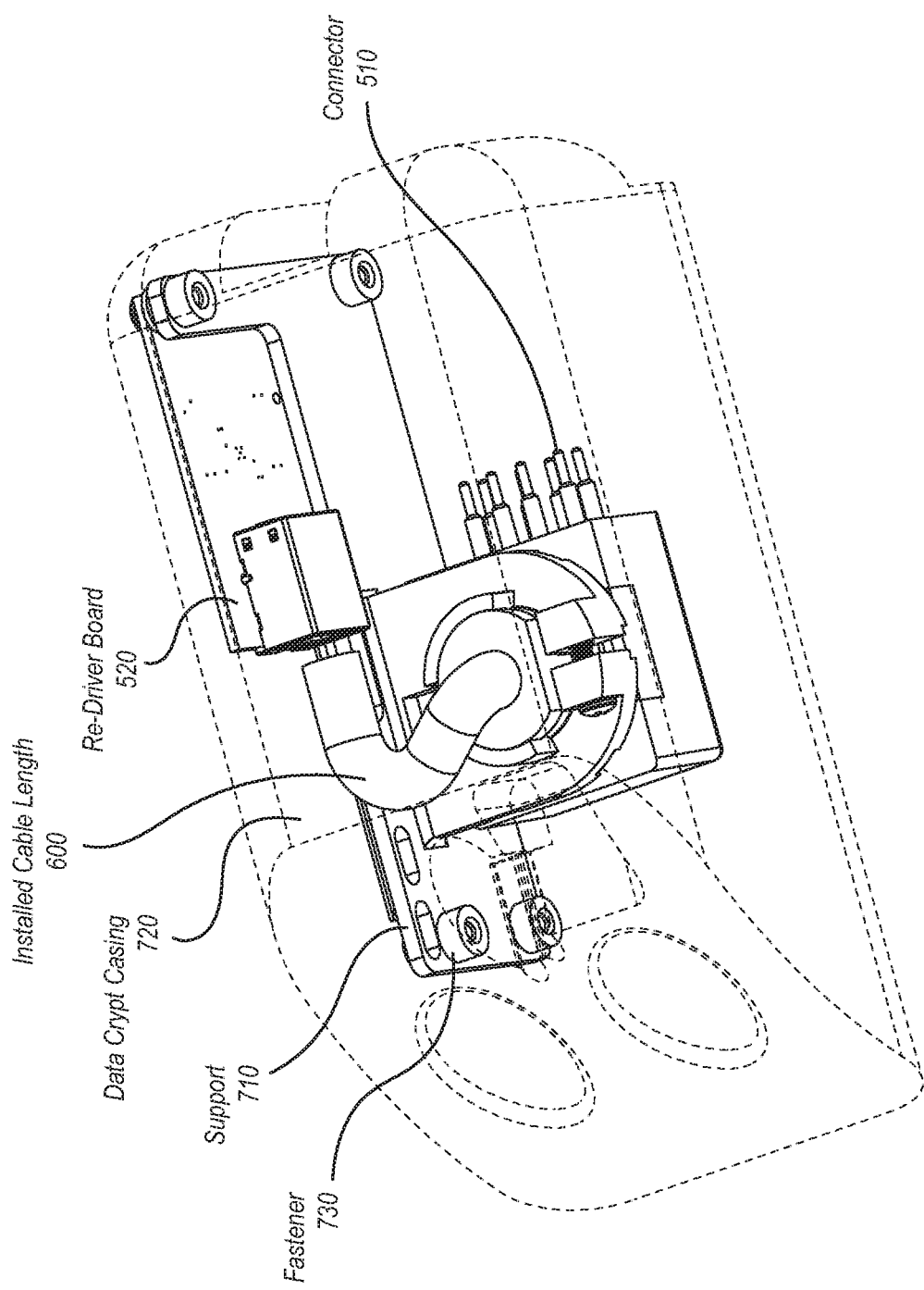
FIG. 7 illustrates an internal view of the data crypt from a top angle.

FIG. 7 includes an x-ray, phantom rendering (showing the exterior, with phantom rendering of internal components) of an embodiment of the data crypt 110 from a top perspective view. From this view it can be seen an embodiment where the supports 710 holding the installed cable length 600 and re-driver board 520.

Figure 8:
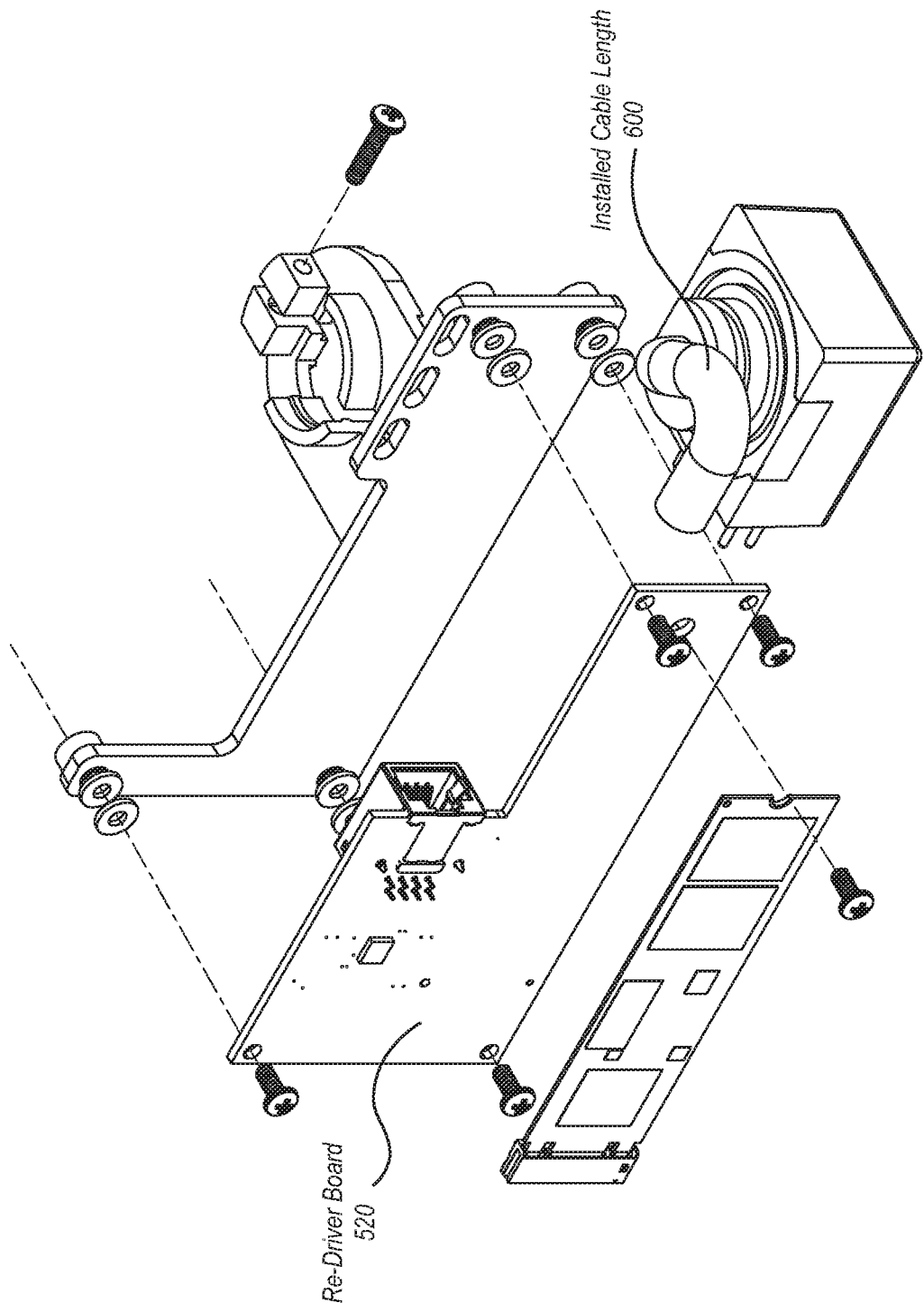
FIG. 8 illustrates the re-driver board of the data crypt.

FIG. 8 further illustrates an embodiment of the re-driver board 520. Note that signals in the data crypt 110 may travel distances on transmission lines which causes degradation of the signals due to attenuation over time through the transmission lines. Thus, in some embodiments, the signals may need to be amplified and retransmitted before being provided to additional components within the data crypt 110, such as persistent storage in the data crypt 110. This is accomplished using the re-driver board 520. However, it should be noted that re-driver board 520 includes circuitry that meets particular conditions. For example, the traces on the re-driver board 520 are precision made to form transmission lines where each line has a similar and/or nearly identical (within some predefined tolerance) transmission line length. Additionally, or alternatively, the transmission lines traces forming transmission lines are formed to have a certain characteristic impedance $Z_0$ (such as 100 Ohms) within a particular tolerance.

Additionally, the re-driver board includes certain re-driver components meeting certain criteria. For example, in some embodiments, the re-driver board has a re-driver chip with low noise and high gain characteristics.

The data crypt 110 may be constructed by arranging the re-driver board and the nonvolatile storage in a particular configuration and then potting those elements using a potting material. For example, in some embodiments the potting material may be an injectable urethane that can be injected around the components in a mold to form the size and shape illustrated in the various Figures illustrated herein. In some embodiments, the potting material may be CONATHAN TU-401 available from Solvay Corporation.

Returning now to FIG. 3, certain mechanical details are illustrated. FIG. 3 illustrates that the data crypt 110 has a body 122 shaped in a consistent way along the length of the body 122 to allow the data crypt 110 to be slid into, and removed from the vehicle 100 as illustrated in FIG. 2. FIG. 3 further illustrates that the data crypt 110 has a curved face 124 which is curved in a fashion to match, and be continuous with, the surface of the hull of the vehicle as illustrated in FIG. 2, such the curve of the face of the data crypt 110 matches the curve of the hull of the vehicle 100.

The ability of the data crypt to be selectively removable is a feature for the use of the UUV as a data collection device for sensitive information. In particular, the ability of the data crypt 110 to be removed from the vehicle 100 allows for the reduced cost and effort in protecting various components. For example, certain government restrictions require any device storing government classified information to be handled in a particular way including stored in particular secured facilities, under the custodianship of certain individuals having certain security clearances, etc. By removing the data crypt 110 from other portions of the vehicle, the data crypt can be handled as a classified device, while the remaining portions of the vehicle can be treated in an unclassified fashion allowing for the largest portion of the vehicle 100 to be handled in a less expensive fashion.

Figure 9:
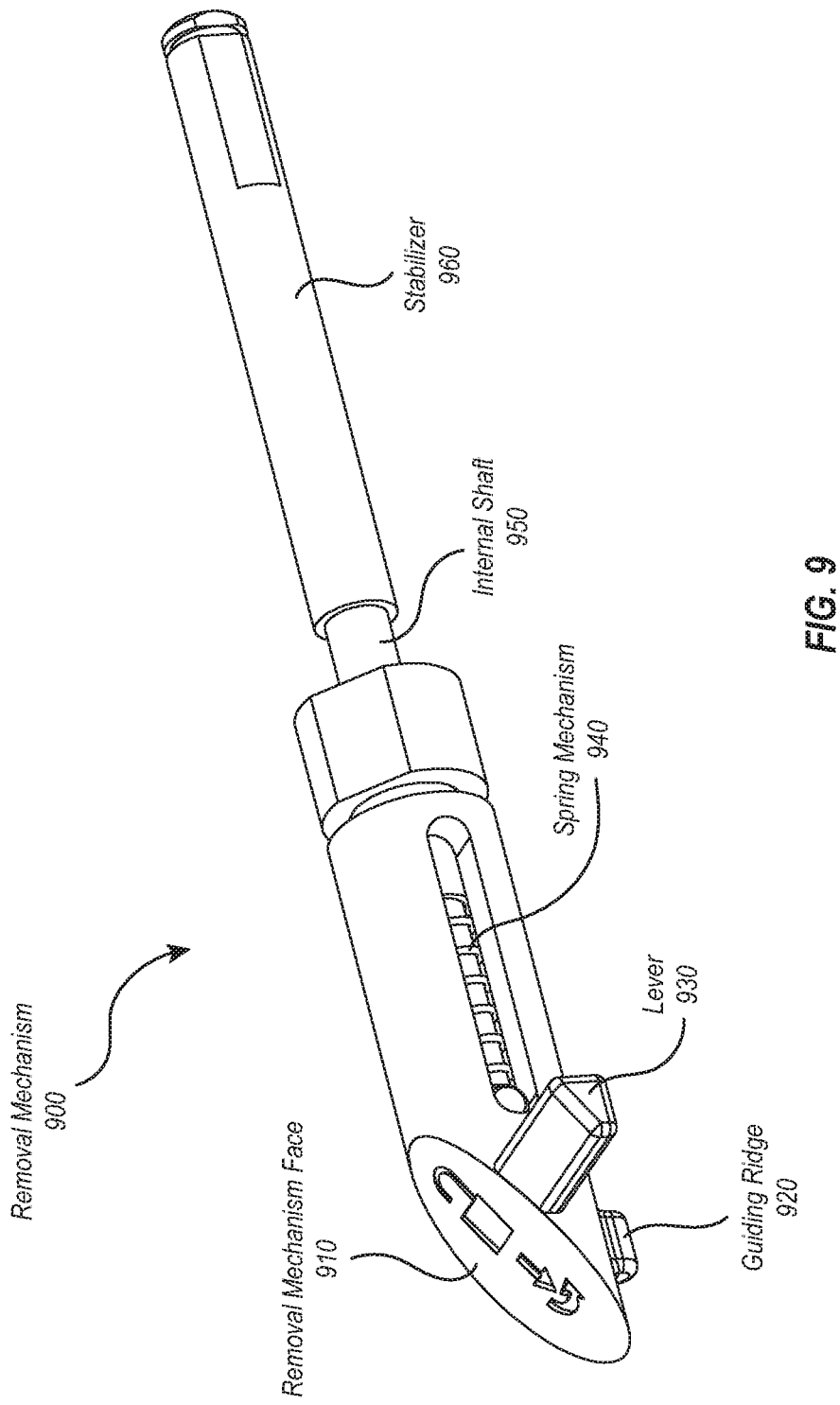
FIG. 9 illustrates a removal mechanism.

FIG. 9 illustrates a locking mechanism 900 used for securing to and removing the data crypt from the UUV. The locking mechanism 900 extends through the length of the data crypt to the back wall of the data crypt casing of the data crypt. To remove the data crypt from the UUV, the user would pull on the removal mechanism face 910 which causes the spring mechanism 940 to collapse and the internal shaft 950 to press through the stabilizer 960. After the internal shaft 950 is fully depressed, the lever 930 can be used to turn the removal mechanism 900 so the guiding ridge is correctly situated in a new groove to allow the data crypt to be removed. The locking mechanism is further illustrated as assembled in the data crypt 100 in FIG. 3. FIG. 3 further illustrates finger holds 120 that can be used to manually pull the data crypt 110 from the vehicle 100.

Further, some embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An unmanned undersea vehicle comprising:
   one or more vehicle sections, the sections comprising a vehicle hull; and
   a data crypt configured to be selectively removable from the vehicle through the hull of the vehicle, the data crypt comprising:
      a persistent storage device configured to operate using SATA protocols; and
      one or more electrical connectors configured to selectively connect the data crypt to electrical equipment in the vehicle, wherein the connectors are impedance matched to mating connectors in the vehicle.

2. The unmanned undersea vehicle of claim 1, wherein the data crypt further comprises a re-driver board configured to amplify data signals being transmitted to the persistent storage, the re-driver board comprising transmission line traces formed to have a characteristic impedance of 100 Ohms.

3. The unmanned undersea vehicle of claim 1, wherein the one or more electrical connectors are coupled to a re-driver board through an installed cable length, the installed cable length having a characteristic impedance of 100 Ohms.

4. The unmanned undersea vehicle of claim 1, wherein the unmanned undersea vehicle is classified, but can be made into an unclassified vehicle by removing the data crypt.

5. The unmanned undersea vehicle of claim 1, wherein the data crypt is the only location on the unmanned undersea vehicle where data can be received and be persistently stored.

6. The unmanned undersea vehicle of claim 1, wherein the data crypt comprises a curved face where a curve of the face is continuous with a curve of the vehicle hull.

7. The unmanned undersea vehicle of claim 1, wherein the data crypt comprises a locking removal mechanism.

8. The unmanned undersea vehicle of claim 1, wherein the data crypt is potted.

9. A method of assembling an unmanned undersea vehicle, the method comprising:
   assembling one or more vehicle sections, the sections comprising a vehicle hull; and
   selectively installing a data crypt through the vehicle hull, the data crypt configured to be selectively removable from the vehicle through the hull of the vehicle, the data crypt comprising:
      a persistent storage device configured to operate using SATA protocols; and
      one or more electrical connectors configured to selectively connect the data crypt to electrical equipment in the vehicle, wherein the connectors are impedance matched to mating connectors in the vehicle.

10. The method of claim 9, wherein the data crypt further comprises a re-driver board configured to amplify data signals being transmitted to the persistent storage, the re-driver board comprising transmission line traces formed to have a characteristic impedance of 100 Ohms.

11. The method of claim 9, wherein the one or more electrical connectors are coupled to the re-driver board through an installed cable length, the installed cable length having a characteristic impedance of 100 Ohms.

12. The method of claim 9, wherein the unmanned undersea vehicle is classified, the method further comprising declassifying the unmanned undersea vehicle by removing the data crypt.

13. The method of claim 9, further comprising collecting data at the unmanned undersea vehicle while the unmanned undersea vehicle is deployed into an underwater environment and persistently storing the data at the data crypt while preventing the data from being stored persistently at any other location on the unmanned undersea vehicle.

14. The method of claim 9, wherein the data crypt comprises a curved face and wherein selectively installing the data crypt through the vehicle hull comprises installing the data crypt such that a curve of the face is continuous with a curve of the vehicle hull.

15. The method of claim 9, wherein the data crypt comprises a locking removal mechanism and wherein selectively installing the data crypt through the vehicle hull comprises installing the data crypt using the locking removal mechanism to lock the data crypt into the unmanned undersea vehicle.

16. A method of using an unmanned undersea vehicle, the method comprising:
   deploying the unmanned undersea vehicle into an underwater environment, wherein the unmanned undersea vehicle comprises one or more vehicle sections, the sections comprising a vehicle hull, and a data crypt configured to be selectively removable from the vehicle through the hull of the vehicle, the data crypt comprising: a persistent storage device configured to operate using SATA protocols; and one or more electrical connectors configured to selectively connect the data crypt to electrical equipment in the vehicle, wherein the connectors are impedance matched to mating connectors in the vehicle;
   collecting data at one or more sensors at the unmanned undersea vehicle; and
   storing the collected data at the persistent storage device of the data crypt using SATA protocols.

17. The method of claim 16, wherein the data crypt further comprises a re-driver board configured to amplify data signals being transmitted to the persistent storage, the method further comprising amplifying the collected data using the re-driver board prior to storing the collected data at the persistent storage device.

18. The method of claim 16, wherein the unmanned undersea vehicle is classified, the method further comprising declassifying the unmanned undersea vehicle by removing the data crypt.

19. The method of claim 16, further preventing the data from being stored persistently at any other location on the unmanned undersea vehicle.

20. The method of claim 16, wherein the data crypt comprises a locking removal mechanism, the method further comprising removing the data crypt from the unmanned undersea vehicle by unlocking the locking removal mechanism.

* * * * *